Nov. 26, 1963 R. KÜHNE 3,112,408

BISTABLE MULTIVIBRATOR CIRCUIT

Filed Aug. 9, 1960 3 Sheets-Sheet 1

Inventor:
Rudolf Kühne
By Michael S. Striker
Attorney

Nov. 26, 1963

R. KÜHNE 3,112,408

BISTABLE MULTIVIBRATOR CIRCUIT

Filed Aug. 9, 1960

3 Sheets-Sheet 2

Inventor:

Rudolf Kühne

BY

Michael S. Striker

Attorney

BISTABLE MULTIVIBRATOR CIRCUIT

Filed Aug. 9, 1960

3 Sheets-Sheet 3

Inventor:
Rudolf Kühne
By
Michael S. Striker
Attorney

United States Patent Office 3,112,408
Patented Nov. 26, 1963

3,112,408

BISTABLE MULTIVIBRATOR CIRCUIT

Rudolf Kühne, Bern, Switzerland, assignor to Hasler A.G. Werke für Telephonie und Präzisionsmechanik, Bern, Switzerland Filed Aug. 9, 1960, Ser. No. 48,427
Claims priority, application Switzerland Aug. 11, 1959
20 Claims. (Cl. 307—88)

The present invention concerns a bistable multi-vibrator circuit comprising a flip-flop circuit and a control circuit therefor. The flip-flop circuit is equipped as usual with two controllable electronic valve means which may be either electron tubes or transistors. The flip-flop circuit may be for instance the well-known Eccles-Jordan circuit.

The control circuit has the function of switching, upon the application of a trigger or control input pulse, the flip-flop circuit from that one of its two stable states in which it finds itself at the moment of the application of the input pulse, to its opposite state.

Consequently, the direction in which the flip-flop circuit is switched between its two possible stable states depends upon in which of these two stable states the flip-flop circuit finds itself at the moment of the application of the input impulse. In order to derive the desired effect from the existence of the particular state of the flip-flop circuit at such moment, a brief temporary storage of each input impulse is necessary. It is known to provide for such a storage of the input impulse by arranging a suitable capacitance in the circuit. However, circuit arrangements of this type are disadvantageous because the duration of the input impulse is limited to a certain maximum. It has been proposed to overcome this disadvantage by adding to the operating flip-flop circuit a second additional flip-flop circuit for storing the impulses and for serving as a control circuit. However, this expedient involves the addition of a substantial amount of component circuit elements whereby the cost of the entire arrangement and the required space are substantially increased.

It is therefore a main object of this invention to provide for a bistable multivibrator circuit in which the maximum duration of the input impulses is not limited and in which the addition of a second flip-flop circuit for the purpose of storing the impulses is avoided.

It is a further object of this invention to provide for a bistable multivibrator circuit of the type set forth which is comparatively simple in its structure, economical in operation and reliable for a long service life.

It is still another object of this invention to provide for a multivibrator circuit of the type set forth which is suitable for being combined with a plurality of similar circuits for the purpose of constituting a counting chain.

With the above objects in view a bistable multivibrator circuit according to the invention comprises in combination, at least one flip-flop circuit including two controllable electronic valve means capable of being alternatively conductive and non-conductive; and at least one control circuit for controlling said valve means and comprising two magnetic memory means magnetized with mutually opposite magnetic polarities, the magnetization polarity of either of said magnetic memory means being reversible by application of an input impulse of predetermined polarity thereto from a preselected one of said magnetic polarities to the opposite magnetic polarity, said magnetic memory means being respectively connected with said two electronic valve means for rendering one thereof conductive and the other one thereof non-conductive when the magnetization polarity of one of said magnetic memory means is reversed, and for rendering said one of said electronic valve means non-conductive and the other one thereof conductive when the magnetization polarity of the other one of said magnetic memory means is reversed, and means for reversing, after the cessation of said input impulse, under control of said electronic valve means the magnetization polarity of that one of said magnetic memory means which has at that moment said preselected magnetic polarity.

In a preferred embodiment of the invention, the controllable electronic valve means are transistors of conventional type. The magnetic memory means comprise each a core magnetizable with substantially rectangular hysteresis characteristic. Preferably, such an embodiment o fthe invention comprises at least one flip-flop circuit including two transistors, and at least one control circuit for controlling both said transistors and comprising two magnetic memory means respectively connected with said transistors, each of these magnetic memory means including a core means magnetizable with substantially rectangular hysteresis characteristic to either one of opposite polarities and magnetized with mutually opposite magnetic polarities. Input coil means are provided on each core and wound to reverse, upon application of an input impulse of predetermined polarity thereto, the magnetization of that core from a preselected one of said magnetic polarities to the opposite magnetic polarity. Each core further carries output coil means for furnishing an output voltage when the magnetization of the respective core is changed between said opposite polarities thereof, said output coil means of said two magnetic memory means being respectively connected to said two transistors for controlling the latter so as to change between conductive and non-conductive conditions. There are further provided means for changing the magnetization polarity of said core means of said two magnetic memory means, respectively, under control of that one of said transistors which is in conductive condition.

Preferably, the input coil means of the two cores are connected in series and wound so that an input impulse of predetermined polarity would tend to produce in both cores an identical preselected magnetic polarity. The means last mentioned in the preceding paragraph comprise, on each core, a bias or control winding having a number of ampereturns sufficient for saturating the respective core and so dimensioned that the above mentioned input coil has at least twice the number of ampereturns compared with the number of ampereturns of the bias or control winding. The bias or control winding of one core is connected in the controlled circuit of one of the transistors, and the bias or control winding of the other core is connected in the controlled circuit of the other one of the transistors, and each bias or control winding is wound so that it magnetizes the respective core with a polarity opposite to that produced by the application of an input impulse to the respective input coil. The output coil of either core furnishes, when the magnetization polarity of the particular core is reversed by the application of an input pulse, a voltage which causes the switching of the flip-flop circuit from one of its stable states to the other one of its stable states.

Thus it can be seen that in this arrangement a reversal of magnetization polarity of one of the magnetic cores causes a switching of the flip-flop circuit between its stable states, and the magnetic cores serve for magnetically storing the individual impulses.

A valuable application of the above described bistable multivibrator circuits according to the invention are counting circuits. Therefore the invention also concerns a counting circuit arrangement for binary impulse counting procedure. It is possible to use such a counting circuit arrangement for counting in one direction (i.e. either forward or additively, or backward or subtractively), or also alternatively both for forward and backward counting as may be desired. A counting circuit arrangement of the contemplated type comprises a plurality of counting stages connected with each other in cascade or in tandem, the number of the counting stages corresponding to the desired or required number of orders of the binary numbers to be processed.

In a counting circuit arrangement according to the invention each counting stage consists of a bistable multivibrator circuit of the type set forth. In one form of the counting circuit arrangement designed for counting in one direction only, the control circuit of each stage comprises two magnetizable cores with input, output and control or bias winding as stated above. The input windings of all the magnetizable cores of all the counting stages are connected with each other in series. However, in each stage the bias winding of one of the magnetizable cores is supplied with energy passing through all the input windings of those stages which, in the direction of counting, follow the particular stage. On the other hand, the energy supply to the other bias winding of the particular stage is carried out directly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
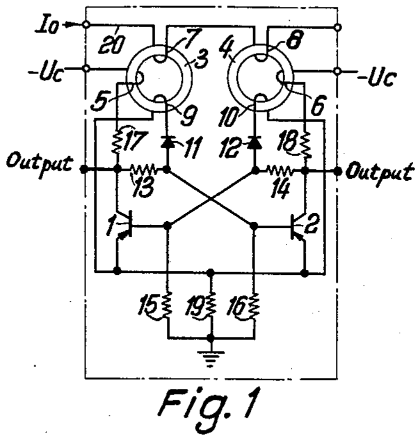
FIG. 1 is a circuit diagram illustrating one embodiment of a bistable multivibrator circuit according to the invention.

Referring now to FIG. 1, the multivibrator illustrated therein comprises a flip-flop circuit with two transistors 1 and 2 the emitters whereof are connected to ground as shown, via a resistor 19. In this circuit the base of each transistor 1, 2, respectively, is located in the respective control circuit, while the collectors of these transistors are located in the controlled circuits thereof and the emitters thereof are located in the control as well as in the controlled circuits of the respective transistors. The bases of the transistors are connected to ground, the base of transistor 1 via resistor 15 and the base of transistor 2 via the resistor 16, as shown. In addition, the base of each transistor is connected via resistors 13, 14 respectively, with the collector of the other transistor.

The circuit according to FIG. 1 further comprises a control circuit for the flip-flop arrangement. This control circuit comprises two annular magnetizable cores 3 and 4 made of ferromagnetic material having a substantially rectangular hysteresis characteristic. Each of the magnet cores 3 and 4 carries an input winding 7, 8, respectively, a bias or control winding 5, 6, respectively, and an output winding 9, 10, respectively.

The bias or control windings 5 and 6 of the cores 3 and 4, respectively, are both connected at one of their ends to a source of negative voltage $-Uc$ of approximately $-6$ to $-12$ volts, the other end of winding 5 being connected via resistor 17 to the collector of transistor 1, and the other end of winding 6 being connected via resistor 18 to the collector of transistor 2. Consequently the bias or control windings 5 and 6 are located in the controlled circuit of the respective transistors 1 and 2. The bias or control windings 5 and 6 are so dimensioned that their numbers of ampereturns are sufficient for saturing the respective core.

Each of the input windings 7 and 8 is dimensioned to have at least twice as many ampereturns as the respective bias or control windings 5 and 6, respectively. It is to be noted that the input windings 7 and 8 are wound in the same direction so that an input pulse will tend to magnetize the cores 3 and 4 to the same magnetic polarity. However the winding 5 in relation to input winding 7, and similarly winding 6 in relation to the input winding 8 are wound in such a direction that a current flowing through the bias or control windings 5 and 6, respectively will tend to magnetize the respective cores to a magnetic polarity opposite to that one which is effected by the input windings 7 and 8.

The output windings 9 and 10 are wound oppositely to each other, one end thereof being conected to the emitters of the transistors 1 and 2, but the other end of the output winding 9 is connected via a diode 11 to the base electrode of transistor 2, and the corresponding other end of the output winding 10 is connected via a diode 12 to the base electrode of transistor 1. Thus, the output winding 9 is connected in the input circuit of the transistor 2 whose output circuit contains the connection between its collector and the bias or control winding 6, while the output winding 10 is located in the input circuit of the transistor 1 whose output circuit contains the connection between its collector and the bias or control winding 5. The diodes 11 and 12 are connected with such a polarity that the application of a negative potential to the base electrode of the respectively connected transistor is assured.

The output windings 9 and 10 are wound in such a direction and have such a number of ampereturns that when an input pulse flowing through the input coils 7 and 8, respectively, reverses the magnetization of the respective cores 3 and 4 to opposite magnetic polarity, a voltage is induced across the respective output windings 9 and 10 which shifts the potential at the base electrode of the respective transistor temporarily in negative direction in such a manner that the particular transistor which was before this moment non-conductive is now rendered conductive and therefore causes the switching of the flip-flop circuit to a state different from the one in which it was before.

The operation of the bistable multivibrator circuit according to FIG. 1 is as follows. For the purpose of this explanation it is assumed that the flip-flop circuit is in that one of its two statble states in which the transistor 1 is conductive and the transistor 2 is non-conductive. The impulse input line 20 carries no current and no current flows through output windings 9 and 10.

The collector current of the transistor 1 flows through the bias or control winding 5 whereby the core 3 is magnetized. This magnetization is defined, for the purpose of this description, as having positive magnetic polarity. No current flows through the bias or control winding 6. The core 4 has a remanent negative magnetic polarity. In terms of binary counting this above described condition of the flip-flop circuit corresponds to the digit "1."

If now an impulse $Io$ is applied through the input line 20, having a predetermined polarity tending to magnetize both cores 3 and 4 to negative magnetic polarity, then no voltage is induced across the output winding 10 because the core 4 had already a remanent magnetization of negative magnetic polarity before the application of the impulse. However the magnetization of the core 3 which had positive magnetic polarity is reversed to negative magnetic polarity because the number of ampereturns of the input winding 7 is at least twice that of the bias or control winding 5. On account of the just mentioned reversal of magnetization of the core 3 a current impulse is generated in the output winding 9, this current having a direction of flow which is identical with the direction of conductvity of the diode 11. During this current pulse the transistor 2 is conductive. The consequently appearing collector current of the transistor 2 produces a voltage drop across the resistor 18. This renders the potential of the base electrode of the transistor 1 more positive relatively to its emitter potential, consequently the transistor 1 becomes non-conductive, and its collector current is reduced to practically negligible strength. No voltage drop appears any more across the resistor 17 so that the potential at the base electrode of the transistor 2 becomes more negative relatively to its emitter and this transistor remains thus conductive even after the end of the induced current pulse through the output winding 9. The flip-flop circuit has now changed from one of its stable states to the other one of its two stable states. In terms of binary counting this other state corresponds to the digit "0."

After the end of the duration of the input impulse *Io* the core 4 is magnetized to positive magnetic polarity by the collector current of the conductive transistor 2 flowing through the bias or control winding 6. The core 3 remains now in a condition of remanent magnetization of negative magnetic polarity.

Upon the application of a further input impulse a current pulse is induced in the same manner as described above in the output winding 10 whereby the transistor 1 is rendered conductive which, in turn, renders the transistor 2 non-conductive. Since transistor 2 is non-conductive the transistor 1 remains conductive even after the induced current across the output winding 10 has decayed. Now the flip-flop circuit is again in the initial or first mentioned stable state which corresponds, in terms of binary counting, to the digit "1." After the cessation of the input pulse *Io* the core 3 is magnetized to positive magnetic polarity by the collector current of the conductive transistor 1 flowing through the bias or control coil 5, while the core 4 is kept by remanent magnetism at negative magnetic polarity which was caused by the input pulse *Io*.

Figure 2:
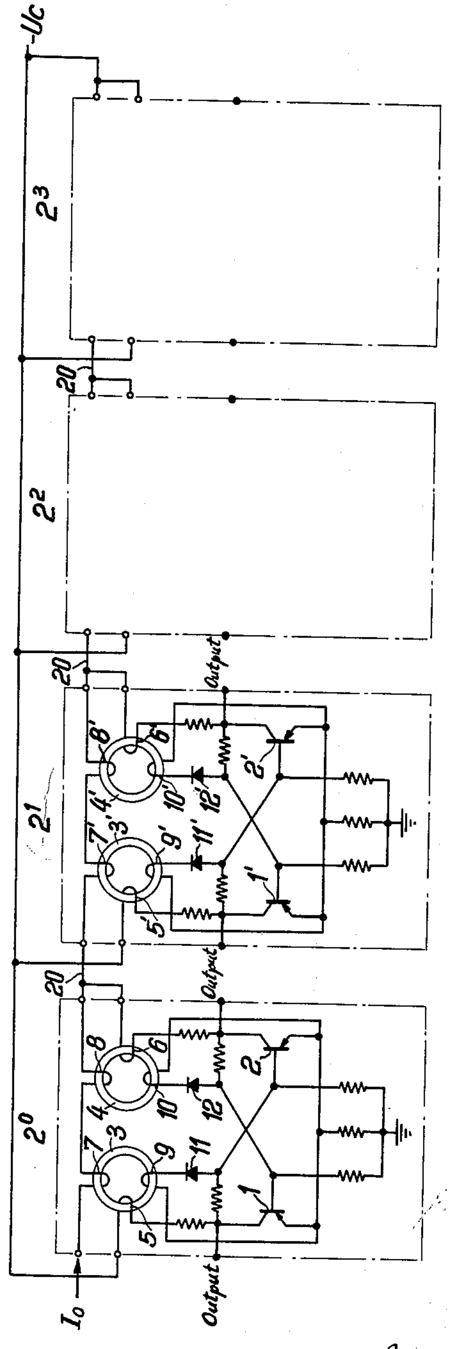
FIG. 2 is a diagram of a counting circuit arrangement for binary impulse counting in forward direction only, each counting stage consisting of a circuit according to FIG. 1.

As can be seen, the control of the flip-flop circuit by means of the two magnetizable cores requires only very few circuit components, and the duration of the input impulses *Io* has no influence on the switching of the flip-flop circuit between its two stable states. FIG. 2 illustrates the utilization of a bistable multivibrator circuit according to FIG. 1 as a counting stage in a counting circuit arrangement. The illustrated example is a counting circuit for binary counting impulses in forward direction up to a four-order binary number. The first order of this binary number is associated with the counting stage $2^0$, the second order of the binary number is associated with the stage $2^1$, the third order of the number is associated with the stage $2^2$, and the fourth order of the number is associated with the stage $2^3$. Each stage consists of a bistable multivibrator circuit according to FIG. 1. Only the first two stages are illustrated in detail. The reference numerals in stage $2^0$ are the same as those in FIG. 1, and the reference numerals in stage $2^1$ are the same as those in the first stage except that the numerals are primed. The input windings 7 and 8 of the first stage $2^0$ and the input windings 7' and 8' of the second stage $2^1$ are connected with each other in series by the input line 20. Although this is not shown for the further stages it is to be understood that all input windings of all the stages are connected in this manner in series with each other. The above mentioned potential $-Uc$ is applied to the whole circuit arrangement at a terminal at its righthand end, as seen in FIG. 2. By the connections shown in FIG. 2, the voltage $-Uc$ is applied to the bias or control winding 5 of the first stage $2^0$, to the similar winding 5' of the second stage $2^1$ and also to the other kindred bias or control windings of the third and fourth stages $2^2$ and $2^3$, not shown in detail, directly. The same voltage $-Uc$ is applied to the second bias or control winding 6 of the first stage $2^0$ via all the series-connected input windings 7' and 8' etc. of the higher stages $2^1$, $2^2$ and $2^3$. Similarly the voltage $-Uc$ is applied to the second bias or control winding 6' of the second stage $2^1$ via the series connected input windings of the stages $2^2$ and $2^3$. The same would apply analogously to the second bias or control winding of the third stage $2^2$.

By this particular manner of applying the voltage $-Uc$ to the various bias or control windings 6, 6' etc. of the various lower stages of the counting circuit the following result is obtained.

At the beginning of the counting operation all the stages $2^0$, $2^1$, $2^2$, $2^3$ are in position or condition "0." In this condition the transistors 1 and 1' of the stages $2^0$ and $2^1$ and the corresponding (not shown) transistors of the stages $2^2$ and $2^3$ are non-conductive. The transistors 2 and 2' of the stages $2^0$ and $2^1$ and the corresponding (not shown) transistors of the stages $2^2$ and $2^3$ are conductive. Consequently no current from the source furnishing the voltage $-Uc$ flows through the windings 5 and 5' of the stages $2^0$ and $2^1$ and through the corresponding (not shown) windings of the stages $2^2$ and $2^3$, while current does flow through the windings 6 and 6' of the stages $2^0$ and $2^1$ and through the corresponding (not shown) windings of the stages $2^2$ and $2^3$. The magnet core 3 has now a remanent negative magnetization, while the core 4 is positively magnetized by the collector current of the transistor 2. The collector current of the transistor 2 flows through the input windings 7' and 8' of the stage $2^1$ and through the corresponding (not shown) input windings in the stages $2^2$ and $2^3$, i.e. through the input windings of all stages which have a higher sequential or positional number than the stage $2^0$. The collector current of the transistor 2' of the stage $2^1$ flows accordingly through the (not shown) input windings of the stages $2^2$ and $2^3$, i.e. also through the input windings of all those stages which have a higher sequential or positional number than the stage $2^1$. Therefore, the cores 3' and 4' and the corresponding cores (not shown) of the stages $2^2$ and $2^3$ are also negatively magnetized. It will be understood that the core 4' is magnetized negatively by the collector current of the transistor 2 and is positively magnetized by the collector current of the transistor 2'. However—and this is of great importance—since the winding 8' has, as mentioned above, at least twice as many ampere turns as the winding 6', the negative magnetization is the predominant one and as a result the core 4' is definitely negatively magnetized. The same applies to the corresponding cores of the stages $2^2$ and $2^3$.

As a result of the above, only the core 4 of the whole arrangement is magnetized positively while all the other cores are magnetized negatively.

The electrical condition of the counting arrangement described above corresponds to or represents the binary figure 0000. A counting impulse $I_c$ applied to the input line 20 will now tend to produce negative magnetization of all the cores with the result that now the positive magnetization of the core 4 is converted into negative magnetization whereby the stage $2^0$ is switched from its condition corresponding to the binary digit 0 to a condition corresponding to binary digit 1. This switching procedure corresponds to that one which has been described above in reference to FIG. 1. When now the stage $2^0$ is in the condition corresponding to the digit 1, the transistor 1 is conductive and the transistor 2 is non-conductive, the core 3 is magnetized positively and the core 4 has a remanent negative magnetization. However, the above mentioned input or counting pulse has no effect on the cores 3' and 4' of the stage $2^1$ and on the corresponding (not shown) cores of the stages $2^2$ and $2^3$, because these cores are already in negatively magnetized condition. Therefore, the magnetic condition of the cores 3' and 4' of the stage $2^1$ and of the corresponding (not shown) cores of the stages $2^2$ and $2^3$ is not changed. This means that the first input or counting impulse causes a switching or a change of condition only in the first stage $2^0$. As described above, this stage is now in a condition representing the binary digit 1. Consequently the entire counting arrangement is now in a condition which represents the binary figure 0001. Under these conditions the transistor 1 is conductive and the transistor 2 is non-conductive. Consequently no current flows through the input winding 7' and 8' while the collector current of the transistor 2' flows through the corresponding input windings of the stages $2^2$ and $2^3$ in the same manner as before. The core 3' maintains its remanent negative magnetization because the transistor 1' is non-conductive and the core 4' is positively magnetized by the collector current of the transistor 2'. Consequently now the cores 3 and 4' are positively magnetized, and the cores 3' and 4 and all the cores of the stages $2^2$ and $2^3$ are negatively magnetized.

The next input or counting impulse $I_c$ will therefore reverse the magnetization of the cores 3 and 4' and thereby switch the stages $2^0$ and $2^1$ to opposite condition while the condition of the stages $2^2$ and $2^3$ remains unchanged. Now the condition of the entire counting arrangement corresponds to and represents the binary figure 0010. Under these circumstances the transistor 1 is non-conductive, the transistor 2 is conductive, the transistor 1' is conductive, and the transistor 2' is non-conductive. Now the collector current of the transistor 2 flows again through the input windings 7' and 8' and through the corresponding (not shown) input windings of the stages $2^2$ and $2^3$. A further input impulse will again only switch the stage $2^0$ to opposite condition whereby the counting arrangement assumes the condition representing the binary figure 0011. Now the transistors 2 and 2' are non-conductive and no current flows any more through the input windings of the stages $2^0$, $2^1$ and $2^2$. Current flows only through the input windings of the stage $2^3$. The next or fourth input or counting pulse will switch the stages $2^0$, $2^1$ and $2^2$ to opposite condition while leaving the condition of stage $2^3$ unchanged whereby the counting arrangement assumes a condition which corresponds to the binary figure 0100.

Evidently, if the bias or control windings 5, 5' and the kindred windings of the stages $2^2$ and $2^3$ were connected with the input line 20 in the same manner as this is shown in FIG. 2 for the bias or control windings 6 and 6', and if, on the other hand, the bias or control windings 6 and 6' and the kindred windings of the stages $2^2$ and $2^3$ were so connected for receiving the voltage $-Uc$ as this is shown in FIG. 2 for the bias or control windings 5 and 5', then the illustrated and described counting circuit arrangement would function to count backward instead of forward.

It will be understood that with the changes set forth in the preceding paragraph the arrangement according to FIG. 2 operates for counting in backward direction in the same manner as has been described above for forward counting, with the only difference that during counting in backward direction each stage is switched from its prevailing condition to the opposite condition when all the stages having a lower sequential or positional number are in a condition corresponding to the binary digit 0, while during counting in forward direction the condition of each stage changes when all the stages of lower sequential or positional number are in the condition corresponding to the binary digit 1.

Figure 3:
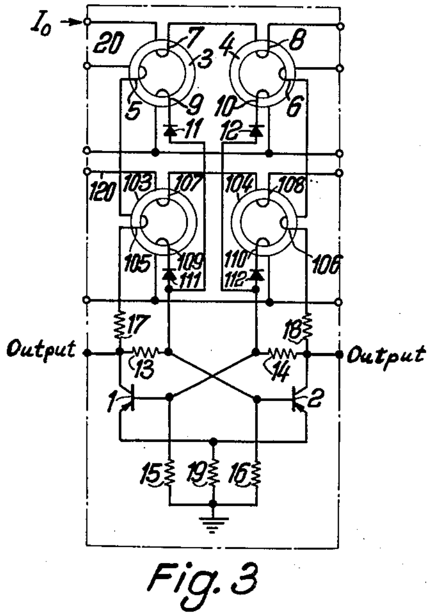
FIG. 3 is a diagram of a modified embodiment of a bistable multivibrator circuit according to the invention.

Referring now to FIG. 3, the bistable multivibrator circuit illustrated thereby differs from that illustrated by FIG. 1 by the fact that the control circuit for he flip-flop arrangement comprises two additional magnetic cores 103 and 104 which likewise are made of ferromagnetic material with a substantially rectangular hysteresis characteristic. The core 103 is associated with the core 3, the core 104 is associated with the core 4. Each of the cores 103 and 104 carries an input winding 107 and 108, respectively, a bias or control winding 105, 106, respectively, and an output winding 109, 110, respectively. The numbers of ampereturns and the direction of winding of all these just mentioned windings is provided in the same manner as described above for the input, bias or control, and the output windings 7, 8, 5, 6 and 9, 10, respectively, of the cores 3 and 4.

The input windings 107 and 108 of the additional cores 103 and 104 are connected in series with each other and are independent of the corresponding input windings 7 and 8 of the cores 3 and 4, respectively. The bias or control windings 5 and 105 of the associated cores 3 and 103 are connected in series with each other and with the resistor 17 located in the collector circuit of the transistor 1. Similarly the bias or control windings 6 and 106 of the associated cores 4 and 104 are connected in series with each other and with the resistor 18 in the collector circuit of the transistor 2. The series connection of the output winding 109 of the core 103 with a diode 111 is arranged in parallel with the series connection of the output winding 9 of the associated core 3 with the diode 11. Similarly, the series connection of the output 110 of the core 104 with a diode 112 is arranged in parallel with the series connection of the output winding 10 of the associated 4 with the diode 12. All the diodes 11, 111, 12, 112 are polarized in the same direction.

The operation of the circuit according to FIG. 3 will be understood from the description further below of the counting circuit arrangement according to FIG. 4

Figure 4:
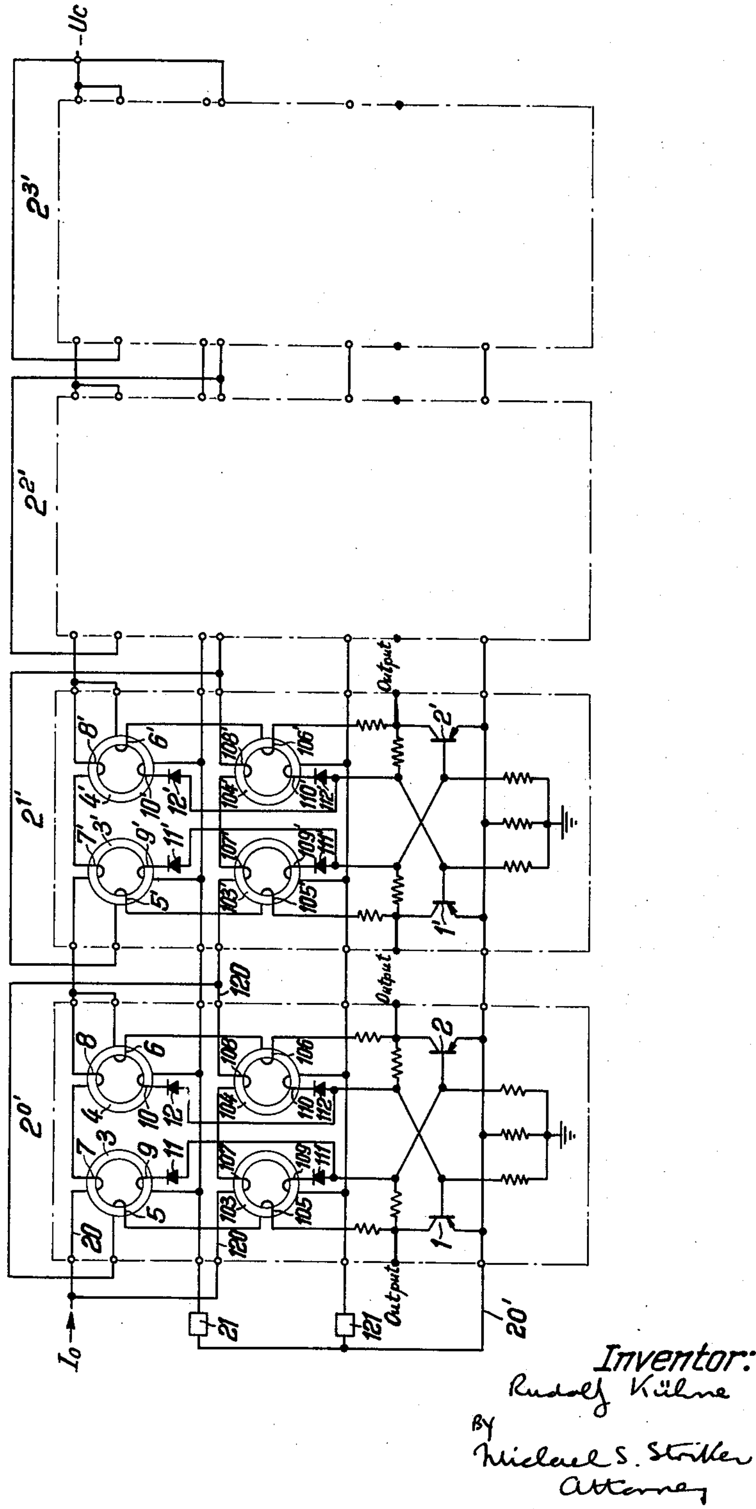
FIG. 4 is a diagram of a modified counting arrangement for binary impulse counting selectably in forward and backward direction, each counting stage consisting of a multivibrator circuit according to FIG. 3.

The counting circuit arrangement according to FIG. 4 is composed of a plurality of bistable multivibrator circuits as shown by FIG. 3. This counting circuit arrangement is designed for binary counting, in forward or backward direction as may be desired, up to a binary number having four orders. The counting stage $2^{0'}$ is associated with the first order of such a number, the second stage $2^{1'}$ is associated with the second order, the third stage $2^{2'}$ is associated with the third order of the number, and the fourth stage $2^{3'}$ is associated with the fourth order of the binary number.

The input windings 7 and 8 of the first stage $2^{0'}$, the input windings 7' and 8' of the stage $2^{1'}$ and the corresponding input windings (not shown) of the higher stages $2^{2'}$ and $2^{3'}$ are all connected with each other in series. A voltage $-Uc$ is applied to a terminal at the right-hand end of the whole circuit arrangement, as seen in FIG. 4. The input windings 107 and 108 of the first stage $2^{0'}$, the input windings 107' and 108' of the second stage $2^{1'}$ and the corresponding input windings (not shown) of the higher stages $2^{2'}$ and $2^{3'}$ are likewise connected with each other in series and this whole series connection is connected in parallel with the series combination of the input windings 7, 8, 7', 8' etc. The voltage $-Uc$ is directly applied to the series connected bias or control windings 5 and 105 of the associated cores 3 and 103 of the stage $2^{0'}$ via the input windings 107', 108' of the second stage $2^{1'}$ and also via the kindred series-connected input windings of the higher stages $2^{2'}$ and $2^{3'}$. The voltage $-Uc$ is applied to the series connected bias or control windings 5' and 105' of the second stage $2^{1'}$ via those input windings of the higher stages $2^{2'}$ and $2^{3'}$ which correspond to the input windings 107 and 108 but are not shown in the drawing. Analogously, the voltage $-Uc$ is applied to the not shown bias and control windings corresponding to the windings 5 and 105 of the stage $2^{2'}$ via the input windings (not shown) corresponding to the input windings 107 and 108, of the stage $2^{3'}$.

The other bias or control windings of associated cores, not mentioned in the preceding paragraph, of each stage are suplied with the voltage $-Uc$ via the input windings of the first mentioned cores of all stages associated with a higher order, respectively. For instance, the voltage $-Uc$ is applied to the bias or control windings 6 and 106 of the first stage $2^{0'}$ via the input windings 7′, 8′ of the second stage $2^{1'}$ and also via the corresponding input windings (not shown) of the higher stage $2^{2'}$ and $2^{3'}$.

The output windings 9, 10, 9′, 10′ and the corresponding output windings of the stages $2^{2'}$ and $2^{3'}$ are connected at their respective ends remote from the respective diode 11, 12 etc. via a switch to a line 20′ connecting the emitters of all the transistors of the whole arrangement. The switch is indicated diagrammatically in FIG. 4 by a block 21. In a similar manner the ends of the output windings 109, 110, 109′, 110′ and the corresponding output windings (not shown) of the stages $2^{2'}$ and $2^{3'}$, remote from the respective diodes 111, 112, 111′, 112′ etc., connected by a second switch to the same line 20′ connecting the emitters of all the transistors of the circuit arrangement. The second switch is also shown in FIG. 4 diagrammatically by a block 121. The switches 21 and 121 may be of any suitable type, including transistors.

If the counting circuit arrangement according to FIG. 4 is to be operated for counting in forward direction, then the switch 21 is moved to conductive position while the switch 121 is moved to circuit interrupting position. Hereby the circuits of the output windings 9, 10, 9′, 10′ etc. of all the stages are closed, while the circuits of the windings 109, 110, 109′, 110′, etc. of all the stages are interrupted. Consequently, the last mentioned output windings 109, 110, 109′, 110′ etc. are not capable of applying a potential to the respective transistors, and now the whole circuit arrangement operates exactly like that one which has been described with reference to FIG. 2.

If it is desired to use or operate the counting circuit arrangement for counting backward then the switch 21 is placed in non-conductive position while the switch 121 is placed in closed position. Now only the output windings 109, 110, 109′, 110′, etc. deliver control potentials to the respective transistors and the whole circuit counts in backward direction as described in reference to FIG. 2. It is to be noted that it is sufficient to place the switch 21 or 121 (or a transistor used as a switch device) in conductive position or condition only for the duration of the impulse derived from the output windings, which duration is only a few microseconds. The switching devices 21 and 121 may be of such a nature that they can be controlled by the impulses causing the forward or backward counting, respectively, in the counting circuit arrangement.

The operation of the arrangement according to FIG. 4 is as follows. It may be assumed that the counting arrangement is in a condition which corresponds to or represents the binary figure 0011. Under these circumstances, the transistors 1 and 1′ are conductive and the corresponding (not shown) transistors of the stages $2^{2'}$ and $2^{3'}$ are non-conductive. The transistors 2 and 2′ are non-conductive and the corresponding transistors (not shown) in the stages $2^{2'}$ and $2^{3'}$ are conductive. The collector current of the transistor 1 flows through the winding 105, the winding 5 of the now inactive core 3, through the input windings 107′ and 108′ and through the corresponding (not shown) input windings of the stages $2^{2'}$ and $2^{3'}$ and from there to the terminal marked $-Uc$. The current of the transistor 1′ flows through the winding 105′, the winding 5′ of the now inactive core 3′ and through the input windings (not shown but corresponding to windings 107′ and 108′) in the stages to $2^{2'}$ and $2^{3'}$ and from there to the terminal marked $-Uc$. The core 104 has remanent negative magnetization. The collector current of the transistor 1 magnetizes the core 103 positively but magnetizes the cores 103′ and 104′ and the corresponding cores of the stages $2^{2'}$ and $2^{3'}$ negatively.

An impulse appearing in the interconnected input lines 20 and 120 tends to cause negative magnetization of all the cores. However, such impulse causes a reversal of the existing magnetization only in the core 103 because all the other cores are already negatively magnetized. The reversal of the magnetization of the core 103 causes in the same manner, as described for the core 3 in FIG. 1, a switching of the condition of the stage $2^{0'}$ to opposite condition whereafter the transistor 1 is non-conductive and transistor 2 is conductive, the core 103 has remanent negative magnetization and the core 104 is positively magnetized. The condition of all the other stages remains unchanged. The entire counting arrangement is now in a condition corresponding to the binary figure 0010. Since the transistor 1 is non-conductive, no current flows any more through the windings 107′ and 108′. The core 104′ remains in remanent negative magnetic condition. The collector current of the conductive transistor 1′ flows through the winding 105′, the winding 5′ of the now inactive core 3′, through the windings (not shown but corresponding to the windings 107′ and 108′) of the stages $2^{2'}$ and $2^{3'}$ and from there to the terminal marked $-Uc$. Consequently the core 103 is negatively magnetized, the cores 104 and 103′ are positively magnetized, the core 104′ is negatively magnetized and so are the not shown cores corresponding to the cores 103, 103′ and 104, 104′ in the stages $2^{2'}$ and $2^{3'}$ negatively magnetized. A further pulse applied to the line 120 at this condition of the arrangement causes reversal of the magnetization of the cores 104 and 103′, but no reversal of magnetization takes place in the cores 103, 104′ and at those cores of the stages $2^{2'}$ and $2^{3'}$ which correspond to the cores 103, 103′ and 104, 104′ because all these last mentioned cores are already negatively magnetized. The reversal of magnetization of the cores 104 and 103′ results in switching the stages $2^{0'}$ and $2^{1'}$ to opposite condition. Consequently now the transistor 1 is conductive and the transistor 2 is non-conductive, the transistor 1′ is non-conductive and the transistor 2′ is conductive. The condition of the transistors in the stages $2^{2'}$ and $2^{3'}$ remains unchanged. The now obtaining condition of the arrangement corresponds to the binary figure 0001.

In this connection the following should be borne in mind. When the collector current of the transistor 1′ flows through the winding 105′ and the collector current of the transistor 1 flows through the winding 107′, then these two curenrts have opposite magnetizing effects on the core 103′. However, the effect of the current passing through winding 107′ predominates because, as mentioned above, this winding has the greater number of ampere-turns. The same applies analogously to all the other cores.

Moreover it should be noted that for instance the collector current of the transistor 1′ of the stage $2^{1'}$ flows not only through those windings of the stages $2^{2'}$ and $2^{3'}$ which correspond to the windings 107, 108 and 107′ and 108′, respectively, and from there to the terminal marked $-Uc$. This current flows at least partly also through the windings 108′, 107′, 108, 107, 3, 4, 3′, 4′, and through those windings of the stages $2^{2'}$ and $2^{3'}$ which correspond to the windings 3 and 4 and from there to the terminal marked $-Uc$. However, this partial current is negligible because it has to flow through a very great number of windings. The same applies analogously also to the other stages.

By suitably connecting the various stages with each other and by providing additional windings it is also possible to utilize bistable multivibrator units according to FIGS. 1 or 3 also for operating in a different type of a number system, e.g. in a decimal number system. Also, shift registers may be constructed by utilizing the above described bistable multivibrator circuits as component units thereof.

It will be understood that each of the elements described above, or two or more together, may also find a useful application in other types of bistable multivibrator circuit differing from the types described above.

While the invention has been illustrated and described as embodied in bistable multivibrator circuit comprising at least one flip-flop circuit and at least one control circuit therefor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essenial characteristics of the generic or specific aspects of this invention, and therefore, such adaptations should and are intended to be comprehended within the meaning and range of equivalence of the following claims.

What is claimed as new and desired to be secured by Letters Patent is:

1. In a bistable multivibrator circuit arrangement, in combination, at least one flip-flop circuit including two controllable electronic valve means each capable of being alternatively conductive while the other one is non-conductive, and vice versa; and at least one control circuit for controlling said valve means and comprising two magnetic memory means magnetized normally with mutually opposite magnetic polarities, the magnetization polarity of either of said magnetic memory means being reversible to a polarity equal to that of the other one by application of an input impulse of predetermined polarity thereto, from a preselected one of said magnetic polarities to the opposite magnetic polarity, said magnetic memory means being respectively connected with said two electronic valve means for rendering one thereof conductive and the other one thereof non-conductive when the magnetization polarity of one of said magnetic memory means is reversed, and for rendering said one of said electronic valve means non-conductive and the other one thereof conductive when the magnetization polarity of the other one of said magnetic memory means is reversed, and means for reversing, after the cessation of said impulse pulse, under control of said electronic valve means the magnetization polarity of that one of said magnetic memory means which has after the application of said input pulse not changed its magnetic polarity.

2. In a bistable multivibrator circuit arrangement, in combination, at least one flip-flop circuit including two controllable transistor means each capable of being alternatively conductive while the other one is non-conductive, and vice versa; and at least one control circuit for controlling said transistor means and comprising two magnetic memory means magnetized normally with mutually opposite magnetic polarities, the magnetization polarity of either of said magnetic memory means being reversible to a polarity equal to that of the other one by application of an input impulse of predetermined polarity thereto, from a preselected one of said magnetic polarities to the opposite magnetic polarity, said magnetic memory means being respectively connected with said two transistor means for rendering one thereof conductive and the other one thereof non-conductive when the magnetization polarity of one of said magnetic memory means is reversed, and for rendering said one of said transistor means non-conductive and the other one thereof conductive when the magnetization polarity of the other one of said magnetic memory means is reversed, and means for reversing, after the cessation of said impulse pulse, under control of said transistor means the magnetization polarity of that one of said magnetic memory means which has after the application of said input pulse not changed its magnetic polarity.

3. In a bistable multivibrator circuit arrangement, in combination, at least one flip-flop circuit including two controllable electronic valve means each capable of being alternatively conductive while the other one is non-conductive, and vice versa; and at least one control circuit for controlling both said valve means and comprising two magnetic memory means respectively connected with said valve means, each of said magnetic memory means comprising a core means magnetizable with substantially rectangular hysteresis characteristic to either one of opposite magnetic polarities, input coil means on said core means wound to produce in said core means a magnetization of one predetermined polarity upon application of an input pulse of predetermined polarity, and output coil means for furnishing an output voltage when the magnetization of said core means is changed between said opposite polarities thereof, said output coil means of said two magnetic memory means being respectively connected to said two valve means for controlling the latter so as to change between conductive and non-conductive conditions, and means for changing the magnetization polarity of said core means of said two magnetic memory means, respectively, under control of that one of said electronic valve means which is in conductive condition.

4. In a bistable multivibrator circuit arrangement, in combination, at least one flip-flop circuit including two transistor means each capable of being alternatively conductive while the other one is non-conductive, and vice versa; and at least one control circuit for controlling both said transistor means and comprising two magnetic memory means respectively connected with said transistor means, each of said magnetic memory means comprising a core means magnetizable with substantially rectangular hysteresis characteristic to either one of opposite magnetic polarities, input coil means on said core means wound to produce in said core means a magnetization of one predetermined polarity upon application of an input pulse of predetermined polarity, and output coil means for furnishing an output voltage when the magnetization of said core means is changed between said opposite polarities thereof, said output coil means of said two magnetic memory means being respectively connected to said two transistor means for controlling the latter so as to change between conductive and non-conductive conditions, and means for changing the magnetization polarity of said core means of said two magnetic memory means, respectively, under control of that one of said transistor means which is in conductive condition.

5. In a bistable multivibrator circuit arrangement, in combination, at least one flip-flop circuit including two transistor means each capable of being alternatively conductive while the other one is non-conductive, and vice versa; and at least one control circuit for controlling both said transistor means and comprising two magnetic memory means respectively connected with said transistor means, each of said magnetic memory means comprising a core means magnetizable with substantially rectangular hysteresis characteristic to either one of opposite magnetic polarities, input coil means on said core means wound to produce in said core means a magnetization of one predetermined polarity upon application of an input pulse of predetermined polarity, and output coil means for furnishing an output voltage when the magnetization of said core means is changed between said opposite polarities thereof, said output coil means of said two magnetic memory means being respectively connected to said two transistor means for controlling the latter so as to change between conductive and non-conductive conditions, and control coil means respectively mounted on said two core means, each control coil means being connected in circuit with the collector of one of said transistor means, respectively, for changing the magnetization polarity of the respective core means of said two magnetic memory means under control of that one of said transistor means which is connected at its collector with said respective control coil means, when that one transistor means is in conductive condition.

6. A circuit as claimed in claim 5, including diode means connected in the circuit of each of said output coil means, respectively, for controlling the base potential of the transistor to which the particular output coil means is connected.

7. A circuit as claimed in claim 6, wherein said input coil means of said two magnetic memory means are connected in series and wound to produce in the core means of said two magnetic memory means the same magnetic polarity.

8. A circuit as claimed in claim 7, wherein the input coil means of a particular core means has a number of ampere-turns at least twice that of the control coil means of the particular core means, and wherein the number of ampere-turns of said control coil means is sufficient to cause magnetic saturation of the particular core means.

9. In a bistable multivibrator circuit arrangement, in combination, at least one flip-flop circuit including two transistor means each capable of being alternatively conductive while the other one is non-conductive, and vice versa; and at least one control circuit for controlling both said transistor means and comprising a first set and a second set of a first and a second magnetic memory means each, respectively connected with said transistor means, each of said magnetic memory means comprising a core means magnetizable with substantially rectangular hysteresis characteristic to either one of opposite magnetic polarities, input coil means on said core means wound to produce in said core means a magnetization of one predetermined polarity upon application of an input pulse of predetermined polarity, and output coil means for furnishing an output voltage when the magnetization of said core means is changed between said opposite polarities thereof, said input coil means of said first set of magnetic memory means being connected in series with each other, and said input coil means of said second set of magnetic memory means being separately connected in series with each other, said output coil means of said first magnetic memory means of said first and second sets thereof having one end connected in parallel to the respective transistor, and said output coil means of said second magnetic memory means of said first and second sets thereof having one end connected in parallel to the respective transistor, said output coil means of one of said sets of magnetic memory means being respectively connected to said two transistor means for controlling the latter so as to change between conductive and non-conductive conditions, and control coil means respectively mounted on each of said core means, the control coil means of said first magnetic memory means of said first and second sets thereof being connected in a first series combination with each other and with the collector of one of said transistor means, and the control coil means of said second magnetic memory means of said first and second sets thereof being connected in a second series combination with each other and with the collector of the other one of said transistor means, for changing the magnetization polarity of the respective core means of said magnetic memory means, under control of that one of said transistor means which is connected at its collector with said respective control coil means, when that one transistor means is in conductive condition.

10. A circuit as claimed in claim 9, including diode means connected in the circuit of each of said output coil means, respectively, for controlling the base potential of the transistor to which the particular output coil means is connected.

11. A circuit as claimed in claim 10, wherein all of said input coil means are wound to produce in the respective core means of all of said magnetic memory means the same magnetic polarity.

12. A circuit as claimed in claim 11, wherein the input coil means of a particular core means has a number of ampere-turns at least twice that of the control coil means of the particular core means, and wherein the number of ampere-turns of said control coil means is sufficient to cause magnetic saturation of the particular core means.

13. In a bistable multivibrator circuit arrangement forming a counting chain, in combination, a plurality of counting stages consecutively assigned to consecutive orders, respectively, of a multi-order number, each stage comprising one flip-flop circuit including two transistor means each capable of being alternatively conductive while the other one is non-conductive and vice versa, and one control circuit for controlling both said transistor means and comprising two magnetic memory means respectively connected with said transistor means, each of said magnetic memory means comprising a core means magnetizable with substantially rectangular hysteresis characteristic to either one of opposite magnetic polarities, input coil means on said core means wound to produce in said core means a magnetization of one predetermined polarity upon application of an input pulse of predetermined polarity, and output coil means for furnishing an output voltage when the magnetization of said core means is changed between said opposite polarities thereof, said output coil means of said two magnetic memory means being respectively connected to said two transistor means for controlling the latter so as to change between conductive and non-conductive conditions, and control coil means respectively mounted on said two core means, each control coil means being connected in circuit with the collector of one of said transistor means, respectively, for changing the magnetization polarity of the respective core means of said two magnetic memory means under control of that one of said transistor means which is connected at its collector with said respective control coil means, when that one transistor means is in conductive condition, said input coil means of all of said core means of all of said stages being connected in series with each other, one end of said control coil means of a first one of the core means of the first stage being connected to a source of control potential in parallel with the analogous ends of the corresponding control coil means of the first ones of the core means of all the consecutive stages, respectively, while one end of said control coil means of the second ones of the core means of said stages, respectively, is connected to said source of control potential across the series-connected input coil means of the respectively subsequent consecutive stages.

14. In a bistable multivibrator circuit arrangement forming a binary counting chain for counting in one direction only, in combination a plurality of counting stages consecutively assigned to consecutive ascending orders, respectively, of a multi-order binary member, each stage comprising one flip-flop circuit including two transistor means each capable of being alternatively conductive while the other one is non-conductive, and vice versa; and one control circuit for controlling both said transistor means and comprising two magnetic memory means respectively connected with said transistor means, each of said magnetic memory means comprising a core means magnetizable with substantially rectangular hysteresis characteristic to either one of opposite magnetic polarities, input coil means on said core means wound to produce in said core means a magnetization of one predetermined polarity upon application of an input pulse of predetermined polarity, and output coil means for furnishing an output voltage when the magentization of said core means is changed between said opposite polarities thereof, said output coil means of said two magnetic memory means being respectively connected to said two transistor means for controlling the latter so as to change between conductive and non-conductive conditions, and control coil means resectively mounted on said two core means, each control coil means being connected in circuit with the collector of one of said transistor means, respectively, for changing the magnetization polarity of the respective core means of said two magnetic memory means under control of that one of said transistor means which is connected at its collector with said respective control coil means, when that one transistor means is in conductive condition, said input coil means of all of said core means of all of said stages being connected in series with each other, one end of said control coil means of a first one of the core means of the first stage being connected to a source of control potential in parallel with the analogous ends of the corresponding control coil means of the first ones of the core means of all the consecutive stages, respectively, while one end of said control coil means of the second ones of the core means of said stages, respectively, is connected to said source of control potential across the series-connected input coil means of the respectively subsequent consecutive stages assigned to the respectively higher orders.

15. A circuit arrangement as claimed in claim 14, including diode means connected in the circuit of each of said output coil means, respectively, for controlling the base potential of the transistor to which the particular output coil means is connected.

16. A circuit arrangement as claimed in claim 15, wherein the input coil means of a particular core means has a number of ampere-turns at least twice that of the control coil means of the particular core means, and wherein the number of ampere-turns of said control coil means is sufficient to cause magnetic saturation of the particular core means.

17. In a bistable multivibrator circuit arrangement forming a binary counting chain for counting alternatively in forward and backward directions, in combination, a plurality of counting stages consecutively assigned to consecutive ascending orders, respectively, of a multi-order binary number, each stage comprising a control circuit for controlling both said transistor means and comprising a first set and a second set of a first and a second magnetic memory means each, respectively connected with said transistor means, each of said magnetic memory means comprising a core means magnetizable with substantially rectangular hysteresis characteristic to either one of opposite magnetic polarities, input coil means on said core means wound to produce in said core means a magnetization of one predetermined polarity upon application of an input pulse of predetermined polarity, and output coil means for furnishing an output voltage when the magnetization of said core means is changed between said opposite polarities thereof, said input coil means of said first set of magnetic memory means being connected in series with each other, and said input coil means of said second set of magnetic memory means being separately connected in series with each other, said output coil means of said first magnetic memory means of said first and second sets thereof having one end connected in parallel to the respective transistor, and said output coil means of said second magnetic memory means of said first and second sets thereof having one end connected in parallel to the respective transistor, said output coil means of one of said sets of magnetic memory means being respectively connected to said two transistor means for controlling the latter so as to change between conductive and non-conductive conditions, and control coil means respectively mounted on each of said core means, the control coil means of said first magnetic memory means of said first and second sets thereof being connected in a first series-combination with each other and with the collector of one of said transistor means, and the control coil means of said second magnetic memory means of said first and second sets thereof being connected in a second series-combination with each other and with the collector of the other one of said transistor means, for changing the magnetization polarity of the respetcive core means of said magnetic memory means under control of that one of said transistor means which is connected at its collector with said respective control coil means, when that one transistor means is in conductive condition, said series-connected input coil means of said first sets of magnetic memory means of all of said stages being connected in series with each other to form a first input circuit, said series-connected input coil means of said second sets of magnetic memory means being connected in series with each other to form a second input circuit, said first and second input circuits being connected in parallel with each other, one end of said first series-combination of control coil means of each stage being connected with said first input circuit at a junction point between the particular stage and the next stage assigned to the respectively higher order and thereby through the remaining portion of said first input circuit to a source of control potential, and one end of said second series-combination of control coil means of each stage being connected with said second input circuit at a junction point between the particular stage and the next stage assigned to the respectively higher order and thereby through the remaining portion of said second input circuit to said source of control potential, the other end of each of the output coils means of said first sets of magnetic memory means of all of said stages being connected in parallel with each other to form a first output circuit, and the other end of each of the output coil means of said second sets of magnetic memory means of all of said stages being connected in parallel with each other to form a second output circuit, switch means being provided for alternatively rendering said first and second output circuits operative, whereby when said first output circuit is operative, input pulses applied to said input circuits cause a counting operation in forward direction, and when said second output circuit is operative, cause a counting operation in backward direction.

18. A circuit arrangement as claimed in claim 17, including diode means connected in the circuit of each of said output coil means, respectively, for controlling the base potential of the transistor to which the particular output coil means is connected.

19. A circuit arrangement as claimed in claim 18, wherein the input coil means of a particular core means has a number of ampere-turns at least twice that of the control coil means of the particular core means, and wherein the number of ampere-turns of said control coil means is sufficient to cause magnetic saturation of the particular core means.

20. A circuit arrangement as claimed in claim 17, wherein said switch means are of the pulse-responsive type and controllable by said input pulses.

References Cited in the file of this patent

UNITED STATES PATENTS

| | | |
|---|---|---|
| 2,873,371 | Van Allen | Feb. 10, 1959 |
| 2,933,622 | Clark | Apr. 19, 1960 |
| 2,945,965 | Clark | July 19, 1960 |
| 2,974,238 | Lohman | Mar. 7, 1961 |

OTHER REFERENCES

Publication: AIEE Transactions, part I, vol. 74, pp. 356–361. July 1955.